US012681692B1

(12) United States Patent
　　Zhang et al.

(10) Patent No.: US 12,681,692 B1
(45) Date of Patent: Jul. 14, 2026

(54) ULTRA-THIN FLEXIBLE DISPLAY DEVICE FOR INTER-VEHICLE VISUAL INTERACTION

(71) Applicant: Zhongshan Popsey Visual Technology Co., Ltd., Zhongshan City (CN)

(72) Inventors: Meiyi Zhang, Fushun County (CN); Jiangbo Li, Lingbao City (CN)

(73) Assignee: Zhongshan Popsey Visual Technology Co., Ltd., Zhongshan City (CN)

( * ) Notice: Subject to any disclaimer, the term of this patent is extended or adjusted under 35 U.S.C. 154(b) by 0 days.

(21) Appl. No.: 19/364,508

(22) Filed: Oct. 21, 2025

(30) Foreign Application Priority Data

Oct. 17, 2025　(CN) .......................... 202522202459.6

(51) Int. Cl.
　　*G06F 3/16* 　　　(2006.01)
(52) U.S. Cl.
　　CPC ..................................... *G06F 3/167* (2013.01)
(58) Field of Classification Search
　　CPC ......... G06F 3/167; G06F 3/014; G06F 3/1423
　　See application file for complete search history.

(56) References Cited

U.S. PATENT DOCUMENTS

2014/0370870 A1 * 12/2014 Mankowski ............ H04W 4/48
　　　　　　　　　　　　　　　　　　　455/418
2021/0272462 A1 * 9/2021 Yang .................... G05D 1/0289
2025/0145002 A1 * 5/2025 Koo ..................... B60K 35/233

OTHER PUBLICATIONS

Arnikaa A. et al., Automatic Accident Detection and Reporting System using NodeMCU, Apr. 11, 2023, International Conference on Trends in Electronics and Informatics, pp. 1451-1457 (Year: 2023).*
Fatima Yousuf Mohammed et al., An Approach to Establishment of Cars to Road Management System, Jan. 1, 2017, International Conference on Communication, Control, Computing and Electronics Engineering, pp. 1-6 (Year: 2017).*

* cited by examiner

*Primary Examiner* — Tam T Tran
(74) *Attorney, Agent, or Firm* — Wang Law Firm, Inc.

(57) ABSTRACT

The present invention discloses an ultra-thin flexible display device for inter-vehicle visual interaction. The device comprises a main control module and a plurality of display modules. The main control module connects to a local vehicle system to acquire a driving instruction and to a terminal device to acquire a custom instruction. Each display module includes a flexible display screen, a communication unit, a voice recognition unit, and a central control unit. The communication unit receives the driving or custom instruction, and the voice recognition unit generates a voice instruction. The central control unit generates an interactive image based on the driving, custom, or voice instruction, and the flexible display screen attached to an inner surface of a vehicle window displays the interactive image to surrounding vehicles, thereby intuitively conveying the driver's intention and improving driving safety.

7 Claims, 3 Drawing Sheets

Receiving a driving instruction from a local vehicle system or receiving a custom instruction from a terminal device or recognizing voice information to generate a voice instruction Based on a driving instruction, a custom instruction, or a voice instruction to generate an interactive image Outputs an interactive image Receiving a driving instruction from a local vehicle system or receiving a custom instruction from a terminal device or recognizing voice information to generate a voice instruction Based on a driving instruction, a custom instruction, or a voice instruction to generate an interactive image Outputs an interactive image

FIG.3

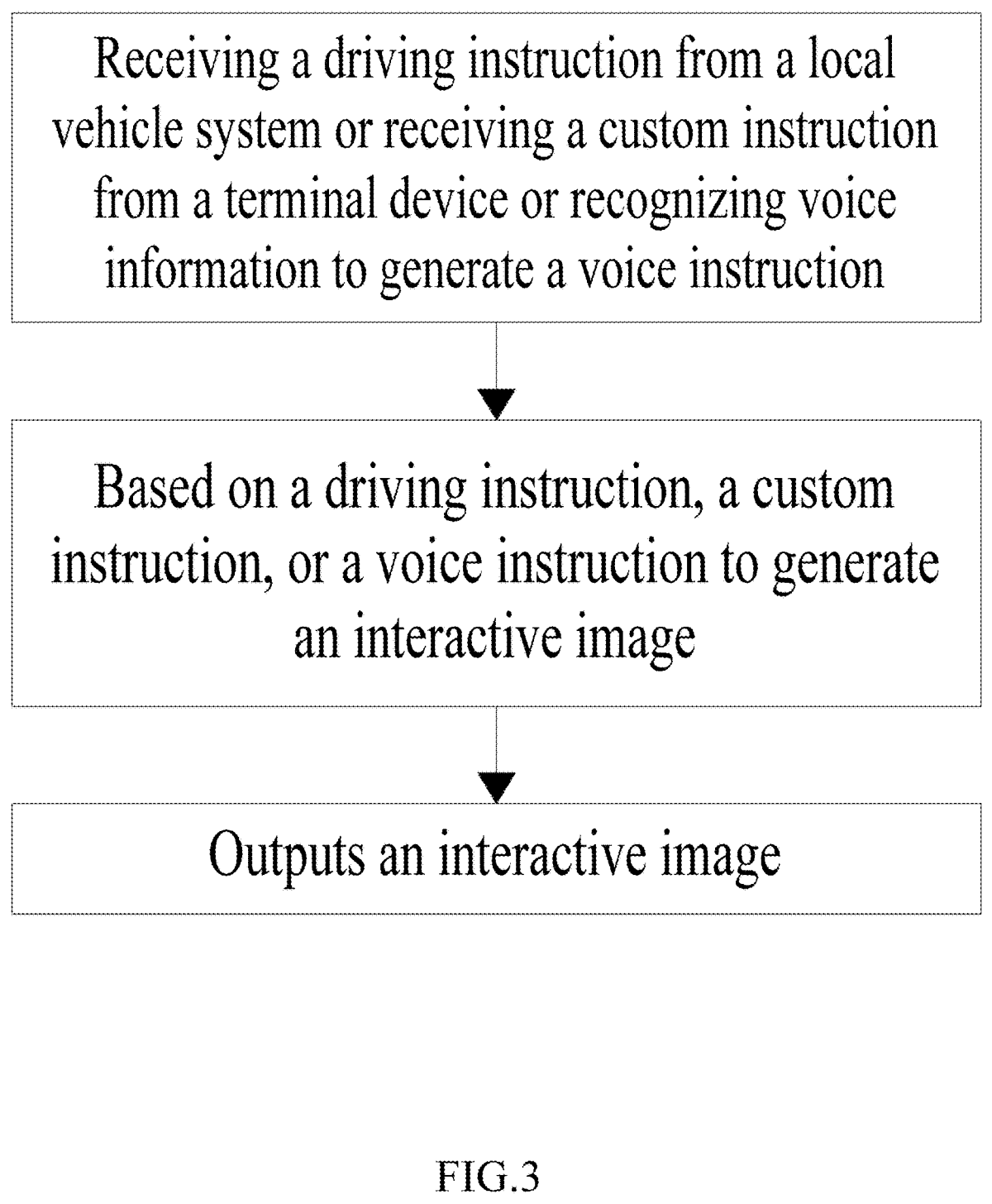

ULTRA-THIN FLEXIBLE DISPLAY DEVICE FOR INTER-VEHICLE VISUAL INTERACTION

FIELD OF INVENTION

The present invention relates to the field of vehicle communication and interaction technologies, and more particularly to an ultra-thin flexible display device for inter-vehicle visual interaction.

BACKGROUND OF THE INVENTION

At present, there is a lack of real-time and effective communication mechanisms between vehicles. Drivers generally rely on conventional signals such as flashing headlights or honking horns to alert nearby vehicles during lane changes, braking, or other maneuvers. However, in actual driving scenarios, different drivers may interpret these signals inconsistently. Such conventional alert behaviors are often incapable of intuitively and accurately conveying a driver's intention, and may even lead to misinterpretation or confusion among surrounding drivers.

SUMMARY OF THE INVENTION

The present invention discloses an ultra-thin flexible display device for inter-vehicle visual interaction, comprising:

a main control module and a plurality of display modules;

the main control module being configured to connect to a local vehicle system to acquire a driving instruction, and to connect to a terminal device to acquire a custom instruction;

each display module comprising a flexible display screen, a communication unit, a voice recognition unit, and a central control unit;

the communication unit being communicatively connected to the main control module to receive the driving instruction or the custom instruction, and the voice recognition unit being configured to recognize voice information to generate a voice instruction;

the central control unit being configured to generate an interactive image based on the driving instruction, the custom instruction, or the voice instruction; and the flexible display screen being attached to an inner surface of a vehicle window to display the interactive image to surrounding vehicles.

In one embodiment, the driving instruction includes one or more of a turning operation, a braking operation, a hazard flashing operation, a door opening operation, an acceleration operation, an autonomous driving operation executed by the vehicle, a fault information generated by the vehicle, and a crash information detected and identified by the vehicle.

In another embodiment, the custom instruction includes preset custom information transmitted from the terminal device, or text information or image information generated by the terminal device.

In another embodiment, the flexible display screen comprises a flexible panel, a row-driving chip, a column-driving chip, a flash-memory chip, and a display-control chip;

the display-control chip being configured to generate a corresponding interactive image based on the driving instruction, the custom instruction, or the voice instruction, and to output a pulse-width modulation (PWM) signal;

the PWM signal being used as a clock signal to drive the row-driving chip and the column-driving chip to extract the interactive image from the flash-memory chip.

In another embodiment, an operation of extracting the interactive image from the flash-memory chip is triggered based on a falling edge of the clock signal, and a display brightness of the flexible panel is adjusted based on a pulse width of the clock signal.

In another embodiment, the main control module is further configured to communicatively connect to main control modules of other vehicles within a communication range to receive driving instructions from the other vehicles.

In another embodiment, in response to a driving instruction of another vehicle within the communication range, the main control module generates an avoidance instruction, and the display module generates and outputs an interactive image corresponding to the avoidance instruction.

In another embodiment, the main control module acquires the driving instruction from the local vehicle system or the custom instruction from the terminal device;

the central control unit acquires the driving instruction or the custom instruction through the communication unit, or acquires the voice instruction through the voice recognition unit;

the central control unit generates the interactive image based on the driving instruction, the custom instruction, or the voice instruction; and the flexible display screen outputs the interactive image.

Compared with the prior art, the present invention provides the following advantages.

In the present invention, the flexible display screen attached to the inner surface of the vehicle window is capable of generating and displaying the interactive image according to the driving instruction, the custom instruction, or the voice instruction, thereby intuitively and accurately expressing the driver's driving intention, reducing misjudgment among surrounding vehicles, and enhancing overall driving safety.

BRIEF DESCRIPTION OF THE DRAWINGS

To more clearly describe the technical solutions of the embodiments of the present invention, several drawings used in the description of the embodiments are briefly introduced below. It should be understood that the drawings are provided merely as examples of certain embodiments of the present invention, and that those skilled in the art may derive other drawings based on these examples without inventive effort.

FIG. 3 is a schematic diagram showing a workflow of the ultra-thin flexible display device for inter-vehicle visual interaction according to an embodiment of the present invention.

DETAILED DESCRIPTION OF THE PREFERRED EMBODIMENTS

The technical solutions of the embodiments of the present invention will be clearly and fully described below with reference to the accompanying drawings. It should be understood that the embodiments described herein represent only some of the embodiments of the present invention, and do not constitute a limitation thereto. Based on the embodiments of the present invention, all other embodiments that can be conceived by those skilled in the art without creative effort shall fall within the protection scope of the present invention.

Figure 1:
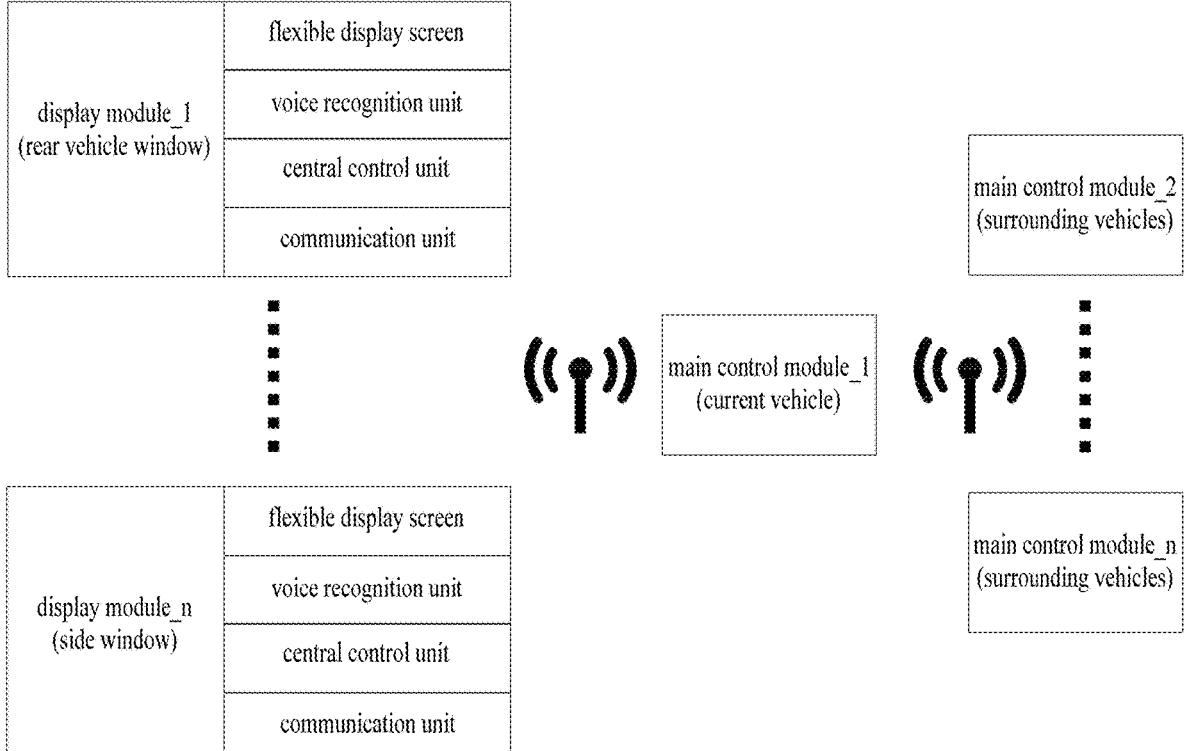
FIG. 1 is a schematic diagram showing a system structure of the ultra-thin flexible display device for inter-vehicle visual interaction according to an embodiment of the present invention.
Figure 2:
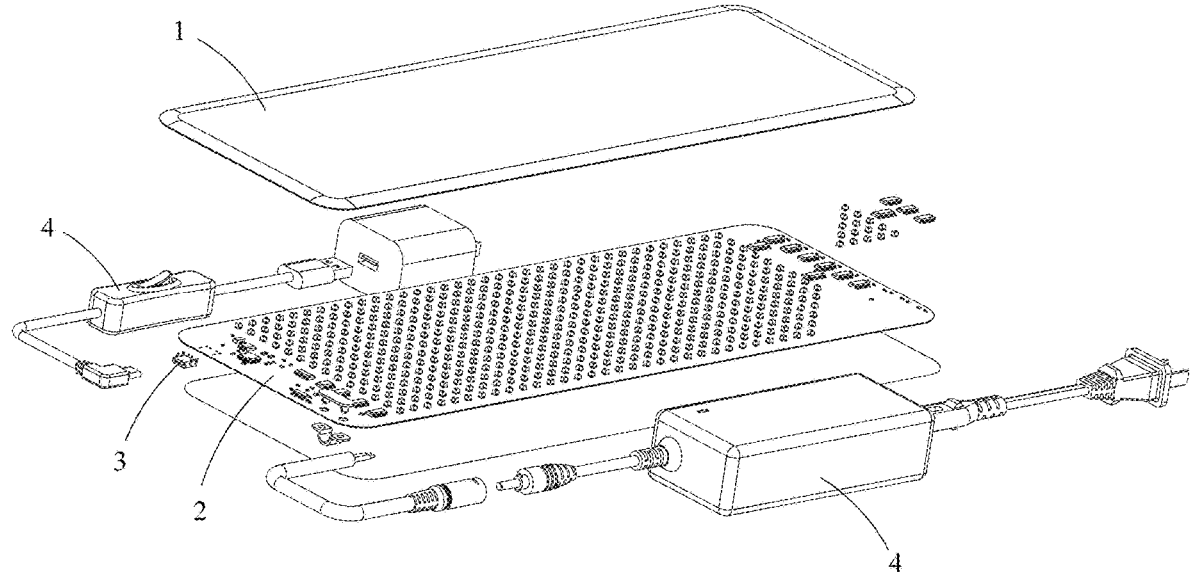
FIG. 2 is a schematic diagram showing a structure of a flexible display screen in the ultra-thin flexible display device for inter-vehicle visual interaction according to an embodiment of the present invention.

Referring to FIGS. 1 to 3, an ultra-thin flexible display device for inter-vehicle visual interaction according to the present embodiment comprises:

a main control module and a plurality of display modules;

the main control module being configured to connect to a local vehicle system to acquire a driving instruction, and to connect to a terminal device to acquire a custom instruction;

each display module comprising a flexible display screen, a communication unit, a voice recognition unit, and a central control unit;

the communication unit being communicatively connected to the main control module to receive the driving instruction or the custom instruction, and the voice recognition unit being configured to recognize voice information to generate a voice instruction;

the central control unit being configured to generate an interactive image based on the driving instruction, the custom instruction, or the voice instruction; and the flexible display screen being attached to an inner surface of a vehicle window to display the interactive image to surrounding vehicles.

In the present embodiment, the display module may be disposed on an inner surface of a rear vehicle window, such that the driving intention of the driver of the current vehicle can be intuitively and accurately displayed to a following vehicle.

In addition, the display module is not limited to being disposed on the inner surface of the rear vehicle window. The display module may be arranged at multiple positions on a single vehicle, such as on the rear window, a front windshield, a side window, or an outer surface of the vehicle body, thereby achieving visual interaction between vehicles within the surrounding environment.

In one embodiment, the driving instruction includes one or more of a turning in operation, a braking operation, a hazard flashing operation, a door opening operation, an acceleration operation, and an autonomous driving operation executed by the vehicle, as well as fault information generated by the vehicle and crash information detected and identified by the vehicle.

In another embodiment, the custom instruction includes preset custom information transmitted by the terminal device, or text information or image information generated by the terminal device.

In operation, when the driver drives the vehicle, a corresponding driving operation is output from the local vehicle system, transmitted to the main control module, and conveyed to a specific display module for display. In this manner, surrounding vehicles can intuitively recognize that the current vehicle is braking through the interactive image, such as the text "BRAKING" or a red exclamation mark, displayed on the display module. Similarly, other types of driving operations of the vehicle are also output as corresponding interactive images.

It can be appreciated that, compared with traditional interaction methods such as flashing lights or honking horns, the interactive image is more concrete and intuitive, can more effectively attract the attention of drivers of surrounding vehicles, and can substantially reduce the possibility of misunderstanding or misjudgment by other drivers.

For example, assume that a traffic accident occurs on the right side of the road ahead of the vehicle. The driver of the vehicle decelerates and keeps the right turn signal on to indicate to the following vehicle that an accident has occurred ahead and that turning right should be avoided. However, continuously activating the right turn signal while decelerating may cause negative emotions or confusion in the following driver, who may even attempt to overtake from the right side.

If the driver presets a "CRASH AHEAD" message as custom information on a smartphone and transmits the message to the display module disposed at the rear vehicle window for display, in coordination with activating the right turn signal, the following vehicle can intuitively recognize the road condition ahead and will not misinterpret the driver's behavior.

Accordingly, during vehicle operation, the driver's control actions can be converted into corresponding interactive images for display output. Furthermore, the driver can output custom interactive images via terminal devices such as smartphones, thereby providing high flexibility and adaptability in use.

In one embodiment, the flexible display screen is composed of a flexible panel, a row-driving chip, a column-driving chip, a flash-memory chip, and a display-control chip. The display-control chip generates a corresponding interactive image based on the driving instruction, the custom instruction, or the voice instruction, and outputs a pulse-width-modulation (PWM) signal. The PWM signal serves as a clock signal to drive the row-driving chip and the column-driving chip to extract the interactive image from the flash-memory chip.

Specifically, as shown in FIG. 2, a surface edge of the flexible panel is surrounded by a PU glue 1 or another adhesive medium to attach the panel to the inner surface of the rear vehicle window. A plurality of lamp beads are evenly and densely distributed on the flexible panel and are individually illuminated under the driving of the row-driving chip and the column-driving chip so as to display predetermined text or image patterns.

The lamp beads, the row-driving chip, the column-driving chip, the flash-memory chip, and the display-control chip are all mounted on a flexible PCB panel 2. The flexible PCB panel 2 is further provided with a data interface 3 for directly receiving the interactive image transmitted by an external terminal device. In addition, the flexible PCB panel 2 may be provided with power plugs 4 of various power ratings and plug types to broaden its applicability.

In another embodiment, extraction of the interactive image from the flash-memory chip is triggered on a falling edge of the clock signal, and the display brightness of the flexible panel is adjusted according to a pulse width of the clock signal.

In this configuration, a timer of the display-control chip outputs the PWM signal in a 4 MHz square-wave format and configures the direct-memory-access (DMA) data direction from the flash-memory chip toward the flexible panel. Consequently, the image-extraction process is triggered at each falling edge, allowing the display-control chip to refrain from continuous intervention and instead focus on data and instruction transmission as well as the encoding and decoding of the interactive image.

Furthermore, the display brightness of the flexible panel may be controlled through the pulse width of signal OE in the HUB75 interface, wherein OE is a low-level enable signal. Therefore, the greater the duty cycle of the low-level period, the higher the display brightness of the flexible panel.

The flexible panel may be refreshed eight times within each frame of image. The brightness level is the lowest, value 1, at the first refresh; 2 at the second; 4 at the third; 8 at the fourth; 16 at the fifth; 32 at the sixth; 64 at the seventh; and 128 at the eighth, thereby realizing full-color RGB888 display performance.

Accordingly, within the eight refreshes of each frame, the overall display brightness can be controlled by regulating the on-off state of individual pixel points during each refresh.

In another embodiment, the main control module is further configured to communicate with main control modules of other vehicles within a communication range to receive driving instructions transmitted by those vehicles.

In another embodiment, when a driving instruction from another vehicle within the communication range is received, the main control module generates an avoidance instruction, and the display module generates and outputs an interactive image corresponding to the avoidance instruction.

Specifically, when the main control module receives a driving instruction issued by a surrounding vehicle indicating an avoidance maneuver, the main control module executes a corresponding avoidance operation based on the relative position between the vehicles, and subsequently generates and outputs an avoidance instruction to surrounding vehicles for reference in performing coordinated avoidance.

In another embodiment, the main control module acquires the driving instruction from the local vehicle system or acquires the custom instruction from the terminal device. The central control unit acquires the driving instruction or the custom instruction through the communication unit, or acquires the voice instruction through the voice recognition unit. The central control unit then generates the interactive image based on the driving instruction, the custom instruction, or the voice instruction, and the flexible display screen outputs the interactive image accordingly.

Thus, during the driving process, instructions from multiple sources are aggregated into the central control unit. The central control unit decodes these instructions, generates corresponding interactive images, and iteratively updates the displayed content in real time.

Compared with the prior art, the present embodiment offers the following advantages.

The flexible display screen attached to the inner surface of the vehicle window can generate and display the interactive image according to the driving instruction, the custom instruction, or the voice instruction, thereby intuitively and accurately conveying the driver's driving intention, reducing misjudgment by surrounding drivers, and improving overall driving safety.

What is claimed is:

1. An ultra-thin flexible display device for inter-vehicle visual interaction, comprising:
    a main control module and a plurality of display modules;
    the main control module being configured to connect to a local vehicle system to acquire a driving instruction, and to connect to a terminal device to acquire a custom instruction;
    each display module comprising a flexible display screen, a communication unit, a voice recognition unit, and a central control unit;
    the communication unit being communicatively connected to the main control module to receive the driving instruction or the custom instruction, and the voice recognition unit being configured to recognize voice information to generate a voice instruction;
    the central control unit being configured to generate an interactive image based on the driving instruction, the custom instruction, or the voice instruction; and
    the flexible display screen being attached to an inner surface of a vehicle window to display the interactive image to surrounding vehicles;
    wherein the flexible display screen comprises a flexible panel, a row-driving chip, a column-driving chip, a flash-memory chip, and a display-control chip;
    the display-control chip being configured to generate a corresponding interactive image based on the driving instruction, the custom instruction, or the voice instruction, and to output a pulse-width-modulation (PWM) signal;
    the PWM signal being used as a clock signal to drive the row-driving chip and the column-driving chip to extract the interactive image from the flash-memory chip.

2. The ultra-thin flexible display device for inter-vehicle visual interaction according to claim 1, wherein the driving instruction includes one or more of a turning operation, a braking operation, a hazard flashing operation, a door opening operation, an acceleration operation, and an autonomous driving operation executed by the vehicle, as well as fault information generated by the vehicle and crash information detected and identified by the vehicle.

3. The ultra-thin flexible display device for inter-vehicle visual interaction according to claim 1, wherein the custom instruction includes preset custom information transmitted by the terminal device, or text information or image information generated by the terminal device.

4. The ultra-thin flexible display device for inter-vehicle visual interaction according to claim 1, wherein extraction of the interactive image from the flash-memory chip is triggered based on a falling edge of the clock signal, and a display brightness of the flexible panel is adjusted according to a pulse width of the clock signal.

5. The ultra-thin flexible display device for inter-vehicle visual interaction according to claim 1, wherein the main control module is further configured to communicatively connect to main control modules of other vehicles within a communication range to receive driving instructions transmitted by the other vehicles.

6. The ultra-thin flexible display device for inter-vehicle visual interaction according to claim 5, wherein, in response to a driving instruction of another vehicle within the communication range, the main control module generates an avoidance instruction, and the display module generates and outputs an interactive image corresponding to the avoidance instruction.

7. The ultra-thin flexible display device for inter-vehicle visual interaction according to claim 1, wherein the main control module acquires the driving instruction from the local vehicle system or acquires the custom instruction from the terminal device;
    the central control unit acquires the driving instruction or the custom instruction through the communication unit, or acquires the voice instruction through the voice recognition unit;
    the central control unit generates the interactive image based on the driving instruction, the custom instruction, or the voice instruction; and
    the flexible display screen outputs the interactive image.

* * * * *